Dec. 15, 1959

C. B. NOLTE 2,917,081

VENTED SEAL

Filed Dec. 2, 1955

CLAUDE B. NOLTE
INVENTOR.

HUEBNER, BEEHLER, WORREL & HERZIG
ATTORNEYS

United States Patent Office 2,917,081
Patented Dec. 15, 1959

2,917,081

VENTED SEAL

Claude B. Nolte, Pasadena, Calif., assignor to Barton Instrument Corporation, Los Angeles, Calif., a corporation of California Application December 2, 1955, Serial No. 550,548

8 Claims. (Cl. 137—791)

The invention relates to seals for containing gases under pressure and has particular reference to a seal having a structure and character such that it can be used in differential pressure-responsive devices where the presence of and gradual cumulative character of gaseous leaks is such as to impair the efficiency of the highly accurate measurements expected in measuring devices of this kind.

The development and progress of many industrial processes using gases under pressure has given rise to demands for an increasing number and variety of measuring and indicating devices wherein a greater degree of accuracy can be depended upon than conventional gages which have been prevalent for a number of decades. Devices of this nature which have grown in popularity have been variations of the dual-bellows pressure differential gage which is one built to register and control differences in pressure between two gaseous bodies under pressure as contrasted with gages of the more conventional sort previously used wherein the gas pressures of the separate gaseous bodies have been applied to the two legs of a mercury-filled U tube or manometer, and an accessory means employed to indicate the difference in level of the mercury, which is a measure of the differences in the pressures.

As higher gas pressures have become prevalent, the importance of the pressure differential gage has grown since it has been one which, because of its nature, is subject to severe overloading without impairing its accuracy. Furthermore, it can be kept small in size even though the pressure differences to be measured may be extremely high. One such gage which has found wide-spread use and acceptance is the pressure differential gage shown and described in Patent No. 2,664,749.

Although the pressure differential measuring expedient disclosed in the instrument referred to has been highly accurate and dependable, it has been found that over periods of time where gases of certain types have been encountered packings used to seal the interior of the liquid filled bellows from the gas filled surrounding chamber have had a tendency to pass minute quantities of the gas into the liquid filled bellows and this gradual accumulation of gas when it continues over some months of time causes gas bubbles within the bellows which gradually disturb the accuracy of measurement characteristics of the instrument and will eventually render the instrument inoperative. Even though seals are made gas tight initially, the nature of available sealing materials is such that they tend to adsorb gas while the gas is under pressure and when pressure of the gas in the instrument changes, these gases adsorbed by the sealing material instead of being all released into the gas chamber from whence they came tend to be released also to some degree on the opposite side of the seal and such gases thereby find their way into the body of incompressible liquid within the bellows structure.

Since it is highly desirable to have instruments of this character serve accurately unattended and unserviced for the long periods of time permitted by the mechanics of the instrument itself, the inaccuracies which creep into measurements as a result of seepage of gas become highly objectionable.

It is therefore among the objects of the invention to provide a new and improved vented seal by means of which gases which may be taken up in part by the seal are vented so that they cannot find their way to the opposite side of the seal regardless of wide changes in pressure on either or both sides of the seal.

Another object of the invention is to provide in an instrument which necessitates sealing a gas away from contact with an incompressible liquid a seal of such character that, even though it may be subject to the passage of minute quantities of the gas under certain pressure conditions, the gas is prevented from passing to the liquid.

Still another object of the invention is to provide a vented seal for preventing the bleeding of one fluid under pressure into another fluid under pressure, the seal being such that unwanted fluid which may pass a portion of the seal can be vented by simple and inexpensive means to the atmosphere.

Still another object of the invention is to provide a new and improved differential pressure-responsive device in which a seal is depended upon to separate gas under pressure from an incompressible liquid wherein a vented seal is employed of a simple nature but which is positive in its action, thereby assuring the accuracy of the device over extremely long periods regardless of the character of gases being measured.

Also included among the objects of the invention is to provide a new and improved vented seal for pressure-responsive devices which is extremely simple from the point of view of structure and assembly to the end that such pressure-responsive devices currently available need suffer no appreciable change in structure or design to have incorporated the new and improved positive seal therein.

With these and other objects in view, the invention consists in the construction, arrangement and combination of the various parts of the device whereby the objects contemplated are attained, as hereinafter set forth, pointed out in the appended claims and illustrated in the accompanying drawings.

Figure 1:
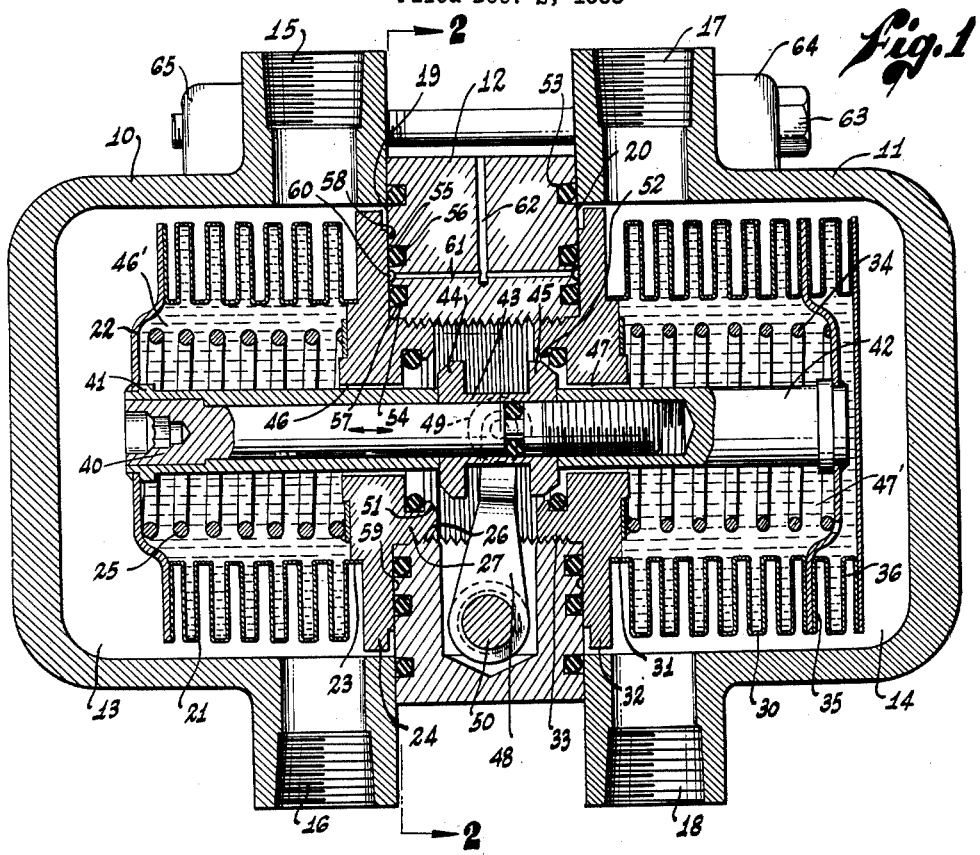
Figure 1 is a longitudinal sectional view of the vented seal of the invention incorporated in a differential pressure-responsive device.
Figure 2:
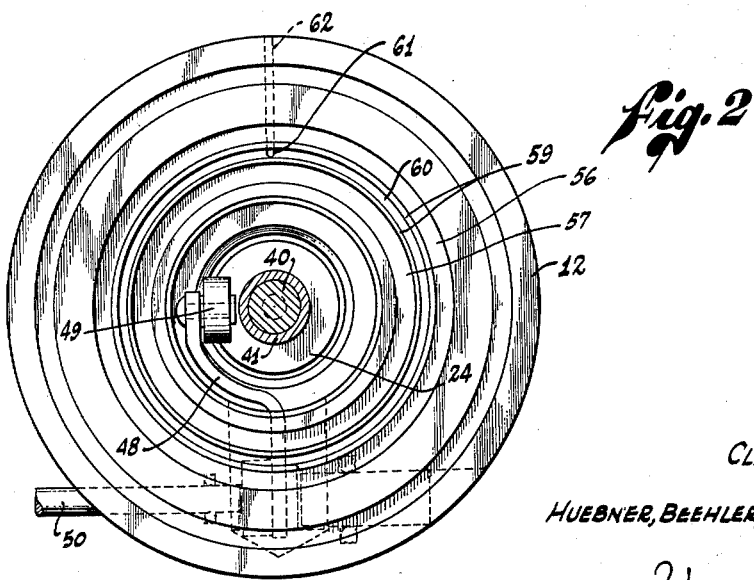
Figure 2 is a cross-sectional view taken on the line 2—2 of Figure 1.

In the drawings there is pictured a differential pressure-responsive device adapted to the purpose of metering flowing fluids and especially gases. The composite assembly constituting the body of the device is made up of housings 10 and 11 mounted upon opposite sides of a partition 12. The housing 10 contains a chamber 13 and the housing 11 contains a chamber 14. A pressure or inlet port 15 and a vent or outlet port 16 serve the chamber 13. A corresponding pressure or inlet port 17 and a vent or outlet port 18, respectively, serve the chamber 14.

On one side of the partition 12 is a face 19 which forms a portion of the wall of the chamber 13. A similar face 20 forms a portion of the chamber 14.

In the chamber 13 a flexible metal bellows 21 has a movable end 22 and a fixed end 23. A base or mounting member 24 has the fixed end of the bellows sweated or otherwise fixed thereon. The partition 12 previously referred to is provided with a threaded central aperture 26 which is adapted to receive a threaded boss 27 of the mounting member. By this means the fixed end of the bellows is firmly attached to the partition. On the other side in the chamber 14 a somewhat similar flexible metal bellows 30 has a fixed end 31 attached to a base or mounting member 32 which in turn by means of a boss 33 is threadedly secured in the threaded central aperture 26.

For fundamental calibration of the instrument a spring 25 is inserted in the bellows 21 between the mounting member and the movable end 22 and a spring 34 of substantially equal tension and size is inserted in the bellows 30 between the mounting member and the movable end 35.

An incident of bellows construction unrelated to the present invention provides an auxiliary temperature compensating bellows extension 36.

A somewhat composite valve mechanism interconnects the movable ends of the bellows. To accomplish this the movable end 22 of the bellows 21 has mounted thereon a central valve stem 40 surrounded by a sleeve 41. The valve stem is designed to threadedly engage a sleeve 42 on the movable end 35 of the opposite bellows 30. The sleeves 41 and 42 confine between them a yoke 43 mounting oppositely facing valve elements 44 and 45, respectively.

In the mounting means 24 and 32 are passages 46 and 47, respectively, which communicate with each other and thereby provide communication between liquid chambers 46' and 47', respectively, in the bellows 21 and 30. Liquid is free to pass from one bellows to the other prompted by changes in pressure on the exterior of the bellows. As pressures changes in the respective chambers reciprocating movement of the composite valve mechanism is transferred to a rocker arm 48 by a roller 49 thereon located between the valve elements 44 and 45. The rocker arm is fastened to a shaft 50 which extends outwardly of the partition through a suitable sealing means.

The composite valve means or mechanism is permitted a certain movement in response to fluid pressures in the chambers 13 and 14. Should such movement, however, exceed a desired amount due to extreme differences in gas pressures, the bellows are prevented from destruction by the seating of one or another of the valve elements 44 and 45 against their respective valve seats 51 and 52, thereby preventing the further transfer of incompressible fill liquid from one chamber to the other. The liquid trapped in the chambers, being incompressible, supports the bellows and prevents distortion or destruction.

When devices of this kind are placed in service, a great variety of gas pressures may be experienced in the respective chambers 13 and 14. The chambers 46' and 47' are filled with an incompressible liquid in such manner and with the aid of such technique as will permit elimination of all gas or air pockets within the liquid chambers so that the entire space will be completely filled with an incompressible liquid. It is desirable that once filled and sealed, no gas of any kind infiltrates the incompressible liquid.

To seal the central aperture 26 from infiltration of gas therethrough into the passages 46 and 47 and corresponding liquid chambers 46' and 47' a seal must be provided between the mounting members 24 and 32 and the respective faces 19 and 20 of the partition 12. The chambers 13 and 14 must also be sealed to confine the fluids therein against leakage to the atmosphere. These seals, inasmuch as they are not critical, may comprise a somewhat conventional packing 53.

To seal against leakage of gas into the liquid chambers, however, special precaution is taken in the form of a vented seal. As here shown the vented seal comprises a pair of spaced concentric recesses 54 and 55 here shown constructed in the partition 12. In each recess is an appropriate annular packing ring 56 and 57, respectively. This is the resilient ring which may be subject to the adsorption of the gas in the chamber 13, for example. Inasmuch as the recesses and packing rings on opposite sides are the same, a description of one will suffice for both. The packing rings are pressed in sealing engagement within the recesses by contact with the opposite face 58 of the mounting means 24. A space 59 is left between the adjacent recesses and in this space in each instance is an annular vent passage 60. At one point in the circumference of the annular vent passage 60 a transverse vent passage 61 is connected and this in turn connects with a vent exhaust passage 62 which communicates with the atmosphere. The housings 10 and 11 and the appropriate seals are made fast and tight by employment of bolts 63 which extend through bosses 64 on the housing 11 and into tapped apertures in the bosses 65 on the housing 10.

In operation when gas pressures change in the chambers 13 and 14, minute quantities of gas are prone to be adsorbed in the packing ring 56 but not in the packing ring 57 inasmuch as the packing ring 56 is the first encountered by any possible leakage of gas between the face 58 and the face 19. After adsorption of the gas into the packing ring 56, when there is a subsequent pressure change permitting adsorbed gas to exude from the packing ring 56, that portion of the gas which passes to the opposite side of the ring finds its ways into the annular vent passage 60 and is thus vented from the passage 60 through the passages 61 and 62 to the atmosphere. Since these passages are under atmospheric pressure, there is no tendency for any quantity of gas which may be present therein to be adsorbed by the packing ring 57. Since the packing ring 57 makes a tight seal, it is a sufficient seal for retaining the liquid in the liquid chambers 46' and 47' against egress to the atmosphere.

As thus described any one of the currently available differential pressure-responsive devices which depend upon face to face sealing between a mounting member for the bellows and the adjacent partition member may be provided with the improved vented seal by having a pair of concentric spaced recesses cut in one of the members leaving a space therebetween for reception of an annular vent passage which is capable of collecting any seepage of gas and venting it to the atmosphere through the partition. By reason of employment of the vent the character of the packing rings becomes less crictal without in any way impairing the positive nature of the seal and its ability to minimize to a very high degree any cumulative inaccuracy in the measurement characteristics of the device which might result from the formation of small air pockets in the incompressible liquid.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. In a differential pressure-responsive device comprising a housing, means forming a chamber in said housing, a partition member in the housing comprising a wall of said chamber, said chamber having a fluid connection thereto from the exterior of the housing, said partition member having a passage therethrough from the chamber, a flexible metal bellows in said chamber having a movable end and a fixed end, a valve means attached to the bellows, a valve seat adjacent said passage, said valve means being engageable with said seat in response to movement of the valve means, a mounting member for the fixed end of the bellows and means connecting said mounting member to the partition member, and a vented seal between the mounting member and the partition member comprising means forming concentric annular seals of packing material spaced from each other and engaging said mounting member and said partition member, means forming an annular space in one of said members between said seals, and a vent passage in the partition member communicating between said space and the atmosphere.

2. A differential pressure-responsive device comprising a housing, a partition member intermediate opposite ends of the housing dividing the interior of the housing into two separate fluid chambers, each chamber having a fluid connection thereto, a face on the partition member facing each respective chamber, said partition member having a passage therethrough interconnecting the chambers, a flexible metal bellows in each chamber adapted to retain an incompressible liquid and having a movable end and a fixed end, valve means attached to at least one bellows, oppositely facing valve seats adjacent said passage, said valve means being alternatively engageable with said seats in response to movement of said one bellows, a mounting member for the fixed end of each bellows and means connecting said mounting members to the partition member, and a vented seal between each mounting and the respective face of the partition member comprising means forming concentric spaced annular seals of resilient material engaging said members forming a space therebetween on the partition member, and a vent passage in the partition member communicating between said space and the atmosphere.

3. A differential pressure-responsive device comprising a housing, a partition intermediate opposite ends of the housing dividing the interior of the housing into two separate chambers, each chamber having a fluid connection thereto, a face on the partition member forming an inner wall of each chamber, said partition member having a central passage therethrough interconnecting the chambers, a flexible metal bellows in each chamber having a movable end and a fixed end, a valve means attached to the movable end of at least one bellows, oppositely facing valve seats in said central passage, said valve means being alternatively engageable with said seats in response to movement of said one bellows, a mounting member for the fixed end of each bellows and means connecting said mounting members respectively to opposite faces of the partition member, and a vented seal between each mounting member and the respective face of the partition member comprising means forming concentric spaced annular recesses in said partition member, means forming an annular space between said annular recesses, a vent passage in the partition communicating between said space and the atmosphere, and an annular sealing ring of resilient material in each recess forced into sealing relationship therewith when said mounting members are connected to said partition.

4. A vented seal comprising members having faces thereof in juxtaposition, means respectively on said members adapted to draw said members and faces thereof together, annular recess means at the junction of said faces spaced one from another, an annular sealing element in each said recess means and means forming an annular space between said sealing elements, and a passage extending through one of said members forming a vent between said space and the atmosphere.

5. In a pressure responsive device comprising a housing member having a chamber therein, a wall member closing said chamber, a passage through the wall member and a flexible element in the chamber positions over said wall member, a vented seal for said members comprising juxtaposed areas on the members, means holding said members in engagement with each other, and means forming concentric annular seals spaced one from another between said areas and forming a space therebetween defined by portions of said areas and said seals, and a vent passage in one member communicating between said space and the atmosphere.

6. In a differential pressure-responsive device comprising a housing, means forming a chamber in said housing, a partition member comprising a wall of said chamber, means holding said housing and said partition member together, said chamber having a fluid connection thereto from the exterior of the housing, said partition member having a passage therethrough from the chamber, a flexible metal bellows in said chamber positioned over said passage and having a movable end and a fixed end, a mounting member for the fixed end of the bellows and means connecting said mounting member to the partition member, and a vented seal between the mounting member and the partition member comprising means forming concentric annular seals of packing material spaced from each other and engaging said mounting member and said partition member, means forming an annular space in one of said members between said seals, and a vent passage in the partition member communicating between said space and the atmosphere.

7. A differential pressure-responsive device comprising a partition member having sealing areas on opposite sides, means forming a passage through said member and the sealing areas thereof, a flexible metal bellows on each side of the partition member located over the passage and adapted to retain a liquid, said bellows having a movable end and a fixed end, a mounting member at the fixed end of each bellows comprising a sealing area and means connecting the sealing area of the bellows with the respective sealing area of the partition member, a vented seal between respectively connected areas comprising means forming concentric annular seals of resilient material spaced one from another and in engagement with said respectively connected areas forming a space therebetween defined by the seals and said sealing areas, means forming a vent passage in the partition member communicating between each said space and the atmosphere, and means forming sealed chambers on opposite sides of the partition member enclosing the partition member and the respective bellows for retention of fluid under pressure, each chamber having a fluid connection thereto.

8. A differential pressure-responsive device comprising a partition member, means forming a passage through said partition member, mounting members secured to the partition member on opposite sides thereof and forming with the partition member a partition assembly, sealing areas on each of said mounting members, a sealing area on the partition assembly for each of said first named sealing areas positioned respectively in face to face relationship and forming thereby pairs of contiguous sealing portions, a vented seal for each pair of contiguous sealing portions comprising means forming concentric annular seals of resilient material spaced one from another in engagement with said contiguous sealing portions and forming a space therebetween defined by the seals and said contiguous sealing portions, means forming a vent passage in the partition member communicating between said spaces and the atmosphere, a flexible liquid containing element sealed upon each said mounting member, an encasement forming a sealed chamber means around said liquid containing element and the partition member for retention of fluid under pressure and fluid connection means to said chamber means.

References Cited in the file of this patent

UNITED STATES PATENTS

| | | |
|---|---|---|
| 965,999 | Faget | Aug. 2, 1910 |
| 1,579,536 | Hodgson | Apr. 6, 1926 |
| 2,433,896 | Gay | Jan. 6, 1948 |
| 2,627,750 | Titus | Feb. 10, 1953 |
| 2,632,474 | Jones | Mar. 24, 1953 |
| 2,705,021 | Wiley | Mar. 29, 1955 |
| 2,762,392 | Reese | Sept. 11, 1956 |